PRESTRESSED CLUTCH DISC
Filed May 14, 1964 2 Sheets-Sheet 1
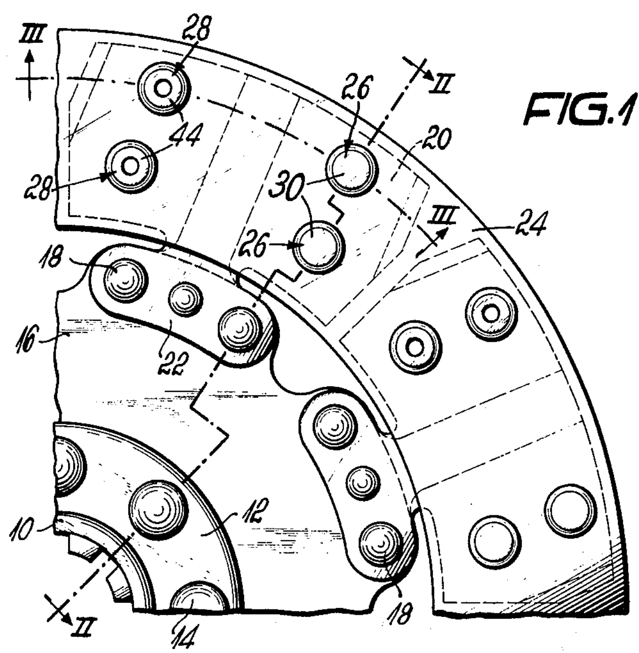
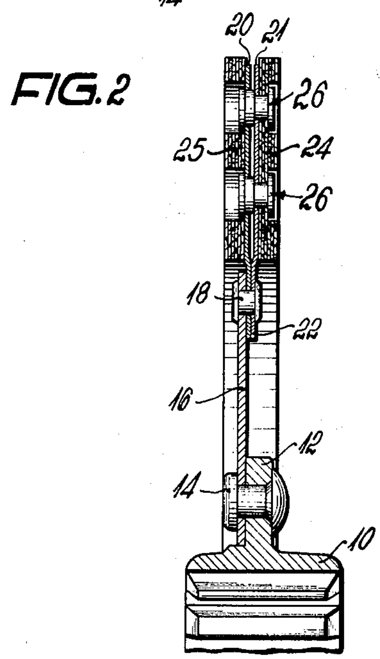
INVENTOR
Richard Binder
By Richard Lind
Ag't July 19, 1966 R. BINDER 3,261,439

PRESTRESSED CLUTCH DISC

Filed May 14, 1964 2 Sheets-Sheet 2

INVENTOR
*Richard Binder*
By Richard Gerl
Ag't 3,261,439
Patented July 19, 1966

3,261,439

PRESTRESSED CLUTCH DISK

Richard Binder, Schweinfurt (Main), Germany, assignor to Fichtel & Sachs A.G., Schweinfurt (Main), Germany, a corporation of Germany Filed May 14, 1964, Ser. No. 367,464
Claims priority, application Germany, May 18, 1963, F 39,781
3 Claims. (Cl. 192—107)

This invention relates to friction clutches of the type employed in automotive vehicles, and more particularly to a clutch disk assembly for such a clutch.

It is desirable to provide resilient mountings for the friction facings of automotive clutches in order to cause smooth engagement and disengagement of the clutch without vibration. The primary object of the invention is the provision of a clutch equipped with resiliently mounted friction facings which is simple, sturdy, and correspondingly inexpensive to manufacture and to maintain.

Another object of the invention is a friction clutch of the type described in which the necessary minimum path of axial relative movement between the clutch disk and cooperating driving pressure plates during engagement and disengagement of the clutch is small.

A further object is the provision of a friction clutch disk of relatively small dimensions and of small mass, and more particularly of dimensions and of a mass which are not substantially greater than the corresponding dimensions and mass of an otherwise similar clutch disk lacking resilient mountings for the friction facings.

With these and other objects in view, as will hereinafter become apparent, the invention in one of its aspects consists in a disk member having a hub portion and a flange portion. The flange portion carries several pairs of leaf springs. The two leaf springs of each pair are at least partly axially superposed and extend circumferentially about the disk axis. The leaf springs are corrugated in such a manner that alternating portions of each leaf spring are respectively adjacent and remote from corresponding portions of the other leaf spring.

At least one tension member is provided for preventing relative axial movement of the remote portions of the two leaf springs away from each other beyond a predetermined position in which the adjacent portions of the two leaf springs transmit resilient stresses to each other. Respective axially spaced portions of the tension member engage respective remote portions of the two leaf springs when the same are in the aforementioned predetermined position. A friction facing is axially superimposed on each member of the several pairs of leaf springs.

Other features and many of the attendant advantages of this invention will be readily appreciated as the same becomes better understood by reference to the following detailed description of a preferred embodiment when considered in connection with the accompanying drawing in which:

FIG. 1 shows one quarter of a clutch disk assembly of the invention in axial plan view;

FIG. 2 shows the device of FIG. 1 in radial section on the line II—II;

Figure 3:
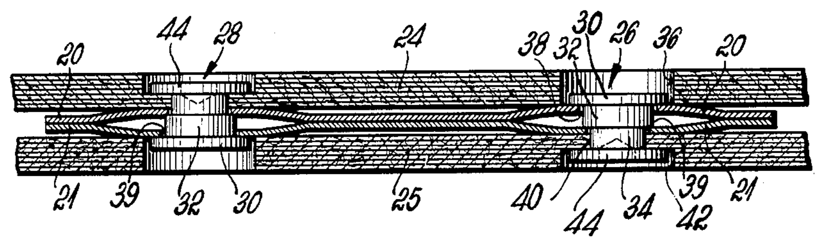
FIG. 3 shows the device of FIG. 1 in enlarged circumferential section on the line III—III.

Referring to the drawing in more detail, and initially to FIGS. 1 to 3, there is seen a clutch disk assembly. The assembly is of the type normally employed in cooperation with two pressure disks of which one may be integral with the flywheel of an internal combustion engine. The pressure disks constitute the input part of a clutch, whereas the disk assembly constitutes the output part.

The disk assembly thus is provided with a tubular hub 10, normally splined for mounting on a drive shaft. A radial flange 12 is integral with the hub. The disk proper is completed by a flat ring 16 which is attached to the flange 12 by rivets 14, as is conventional.

Rivets 18 spaced along the periphery of the ring 16 attach eight circumferentially juxtaposed pairs of leaf springs 20, 21 of resilient sheet material to the ring 16. When viewed in an axial direction as in FIG. 1, each spring has the approximate shape of a ring segment from which a fastening lug 22 projects in a radially inward direction. The rivets 18 pass through bores in the lugs of the axially superposed springs 20, 21 in each pair. As better seen in FIG. 3, each leaf spring is corrugated in such a manner that the low ridges and shallow grooves of the corrugations are elongated in a direction which has at least a major radial component. The leaf springs 20, 21 of each pair thus have circumferentially alternating portions which are respectively adjacent and remote from corresponding portions of the other leaf spring of the pair.

Four shoulder rivets 26, 28 prevent the springs 20, 21 of each pair from moving apart beyond the position illustrated in FIG. 3, and secure annular friction facings 24, 25 to the springs. As seen in FIG. 1, each pair of springs is assembled by means of two rivets 26 and two rivets 28 which are identical with the rivets 26 but are arranged differently. As shown in detail in FIG. 3, the rivet 26 illustrated has a flat retaining head 30, a shoulder 32 adjacent the head, a partly hollow shank 34, and an annular head 44 on the hollow end of the shank.

The friction facing 24 has a bore 36 therethrough. The bore receives the retaining head 30 with adequate clearance to permit free movement of the head. The head 30 abuts on the outer face of the leaf spring 20, but the shoulder 32 passes freely through a bore 38 in an outer ridge of the corrugated spring 20. The corresponding outer ridge (or inner groove) of the spring 21 has a bore 39 aligned with the bore 38 but of smaller diameter so as conformingly to receive the shank 34 of the rivet 26. The shoulder 32 of the rivet abuts against the inner face of the spring 21. The shank 34 also conformingly passes through an opening 40 which partially extends through the laminated friction facing 25 and terminates in an outwardly open coaxial recess 42 of the friction facing. The annular head 44 of the rivet is entirely received within the recess 42 and abuts against the bottom of the same.

The friction facing 25 and the spring 21 are thus fixedly fastened to each other and to the rivet 26 by the opposite faces of the shoulder 32 and of the head 44. The spring 20 is permitted to move toward the spring 21 along the shoulder 32, but is prevented from moving in the opposite direction by the retaining head 30. The other rivet 26 is arranged in the same manner, and the rivets 28 are arranged in an analogous manner to fasten the friction facing 24 to the spring 20 while permitting movement of the spring 21 toward the spring 20.

Figure 4:
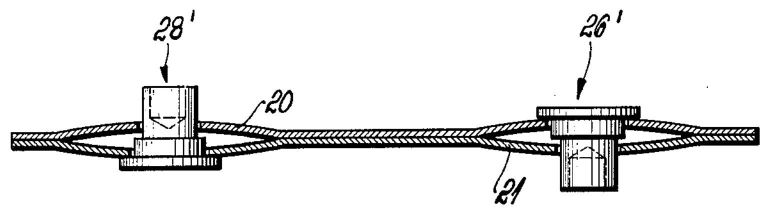
FIG. 4 illustrates elements of the structure shown in FIG. 3 prior to assembly with the remainder of the device.

FIG. 4 illustrates one pair of springs 20, 21 with two of the associated rivets 26', 28' prior to assembly with the friction facings. The springs are merely superimposed in their relaxed condition and the heads 44 are not yet formed on the rivets 26', 28'. It is evident from comparison of FIGS. 3 and 4, that the springs 20, 21 are assembled in such a manner that their contiguously superimposed portions transmit stresses to each other under all operating conditions. Abutment of the spring 20 against the retaining head 30 of the rivet 26, and abutment of the spring 21 against the corresponding head of the rivet 28 prevent movement of the springs into a position in which the springs are fully relaxed, and no significant stresses are transmitted between them, as illustrated in FIG. 4.

The clutch disk assembly illustrated includes but a small number of different parts. The disk assembly is therefore capable of being manufactured at low cost. It is simple and rugged and thus not subject to deterioration in ordinary use. The springs 20, 21 yield when the friction facings 24, 25 are engaged by the cooperating pressure plates in a conventional manner, but they are deformed in a circumferential direction mainly, and the axial movement of the pressure plates and of the clutch disk relative to each other from the fully released to the fully engaged position of the clutch is increased but very little by the axial component of spring deformation.

The corrugations of the springs 20, 21 do not materially increase the mass of the clutch disk above that of an otherwise similar disk lacking resilient mountings for the friction facings 24, 25. There is no increase in diameter nor in other dimensions.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A clutch disk assembly comprising, in combination:

(a) disk means having an axis, a hub portion adjacent said axis, and a flange portion spaced from said axis;

(b) a plurality of pairs of resilient, axially superposed, corrugated sheet members, (1) each member of said pairs having an inner face axially opposite the inner face of the other member of the pair and an outer face, (2) the corrugations of each member including a plurality of circumferentially alternating, radially extending ridge and groove portions in said inner faces, said ridge portions of each pair abuttingly engaging each other, and the groove portions spacedly facing each other, (3) each sheet member having a lug portion radially offset from said faces toward said axis;

(c) fastening means fastening said lug portions to said flange portions in such a manner that said inner and outer faces are radially outwardly spaced from said flange portion and said pairs of resilient sheet members are circumferentially spaced from each other;

(d) tensioning means for preventing relative axial movement of said groove portions of the members of each pair away from each other beyond a position in which said abuttingly engaged ridge portions transmit to each other resilient axial stresses of a magnitude sufficient to deform said members, (1) each tensioning means including a tension member having two axially spaced portions, one of said portions being fixedly fastened to a groove portion of one of the members of said pair, and the other portion including abutment means engageable with the groove portion of the other member for preventing said axial movement; and (e) two annular friction facings, each facing being axially fastened to one member of each of said pairs.

2. An assembly as set forth in claim 1, wherein said one portion of said tension member includes means fixedly fastening one of said friction facings to said one member.

3. An assembly as set forth in claim 1, wherein said tension member is a shoulder rivet having two terminal heads, a shoulder portion near one of said heads and a shank portion of smaller cross section than said shoulder portion near the other head, said shank and shoulder portions being interposed between said heads; said two friction facings and two groove portions of respective members of each pair being formed with respective aligned openings, said tension member being received in said aligned openings, one head of said tension member being axially freely movable in the opening of one of said friction facings and abutting against the outer face of one of said members in said position of said pair, said one member being axially movable away from said head on the shoulder portion of the tension member, the other member of said pair and the other friction facing being axially retained between said shoulder portion and the other head of said tension member, the shank portion of the tension member being received in the openings of said other member and of said other friction facing.

References Cited by the Examiner

UNITED STATES PATENTS

| | | | |
|---|---|---|---|
| 2,035,916 | 3/1936 | Pope | 192—68 X |

FOREIGN PATENTS

| | | |
|---|---|---|
| 482,808 | 4/1938 | Great Britain. |
| 632,985 | 12/1949 | Great Britain. |
| 495,371 | 12/1952 | Italy. |

DAVID J. WILLIAMOWSKY, *Primary Examiner.*

DON A. WAITE, *Examiner.*

B. W. WYCHE III, *Assistant Examiner.*